US012621209B2

(12) United States Patent　　　　(10) Patent No.:　US 12,621,209 B2

Trujillo　　　　　　　　　　　　　　　(45) Date of Patent:　　　　May 5, 2026

(54) UTILIZATION OF NETWORK FUNCTION (NF) NODE GROUPS FOR COMPUTE OPTIMIZATION AND NF RESILIENCY IN A WIRELESS TELECOMMUNICATION NETWORK

(71) Applicant: Boost SubscriberCo L.L.C., Englewood, CO (US)

(72) Inventor: Andrew Trujillo, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 314 days.

(21) Appl. No.: 18/100,514

(22) Filed: Jan. 23, 2023

(65) Prior Publication Data

US 2023/0336420 A1　　Oct. 19, 2023

Related U.S. Application Data

(60) Provisional application No. 63/331,206, filed on Apr. 14, 2022.

(51) Int. Cl.
H04L 41/08 (2022.01)
G06F 9/455 (2018.01)
(Continued)

(52) U.S. Cl.
CPC ...... H04L 41/0886 (2013.01); G06F 9/45558 (2013.01); H04L 41/046 (2013.01);
(Continued)

(58) Field of Classification Search
CPC ................ H04W 84/02; G06F 9/45558; G06F 2009/45595; G06F 2009/45557; G06F 2009/45591; G06F 2009/45579
See application file for complete search history.

(56) References Cited

U.S. PATENT DOCUMENTS

2019/0163559 A1 *　5/2019　Takahashi ........... G06F 11/0793
2023/0168940 A1 *　6/2023　Panikkar .......... G05B 19/41865
　　　　　　　　　　　　　　　　　　　　718/104
(Continued)

FOREIGN PATENT DOCUMENTS

WO　　WO-2020162680 A1 *　8/2020　............. H04L 63/06

OTHER PUBLICATIONS

Anonymous: "5G and the Cloud—A 5G Americas White Paper", Retrieved from: https://www.5gamericas.org/wp-content/uploads/2019/12/5G-Americas_5G-and-the-Cloud.pdf, Sep. 27, 2021, pp. 1-53.

(Continued)

*Primary Examiner* — Mahran Y Abu Roumi
(74) *Attorney, Agent, or Firm* — Jeremiah J. Baunach; Frontier IP Law PLLC

(57)　　　　　　ABSTRACT

Example embodiments are directed towards utilization of network function (NF) node groups for compute optimization and NF resiliency in a wireless telecommunication network. A plurality of fifth-generation New Radio (5G NR) cellular telecommunication NFs of a telecommunication service provider are implemented as respective containerized network functions (CNFs). Each CNF corresponds to and is implemented by one or more software containers of one or more respective pods for scheduling and execution on one or more respective nodes in a software container orchestration platform that automates deployment, management, and scaling of containerized software applications. The respective nodes of the CNF are deployed in a respective node group of the container orchestration platform. The respective node group is utilized for compute optimization and NF resiliency of the 5G NR cellular telecommunication network at a logical level of the respective pods in the node group.

15 Claims, 6 Drawing Sheets

(51) Int. Cl.
    *H04L 41/046*       (2022.01)
    *H04L 41/0896*     (2022.01)
    *H04L 41/122*      (2022.01)
    *H04W 24/02*      (2009.01)

(52) U.S. Cl.
    CPC ........ *H04L 41/0896* (2013.01); *H04L 41/122*
           (2022.05); *H04W 24/02* (2013.01); *G06F*
                     *2009/45595* (2013.01)

(56) References Cited

U.S. PATENT DOCUMENTS

| | | | |
|---|---|---|---|
| 2023/0195489 A1* | 6/2023 | Lan ....................... | H04W 84/02 |
| | | | 718/1 |
| 2023/0244392 A1* | 8/2023 | Jain ....................... | G06F 3/0631 |
| | | | 711/154 |

OTHER PUBLICATIONS

Arora, S., et al., "Dynamic Resource Allocation and Placement of Cloud Native Network Services", ICC 2021—IEEE International Conference on Communications, Jun. 14, 2021, pp. 1-6.
International Search Report and Written Opinion received for PCT Patent Application No. PCT/US2023/018072, mailed on Jul. 13, 2023, 11 pages.
Latif, A., et al., "Telco Meets AWS Cloud: Deploying DISH's 5G Network in AWS Cloud", Retrieved from: https://aws.amazon.com/blogs/industries/telco-meets-aws-cloud-deploying-dishs-5g-network-in-aws-cloud/, Feb. 27, 2022, 10 pages.

\* cited by examiner

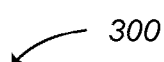
300
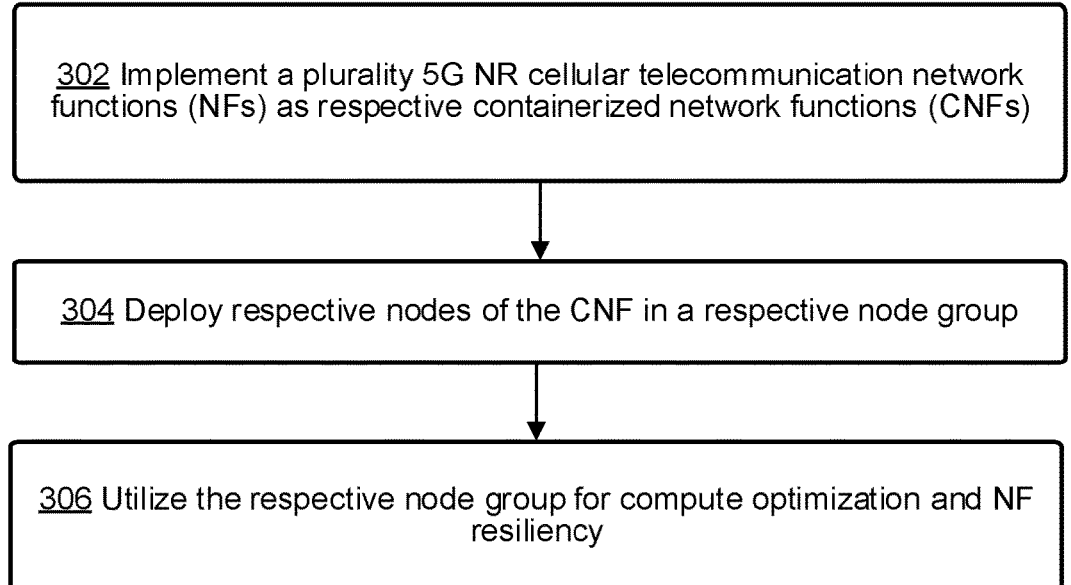
302 Implement a plurality 5G NR cellular telecommunication network functions (NFs) as respective containerized network functions (CNFs)
304 Deploy respective nodes of the CNF in a respective node group
306 Utilize the respective node group for compute optimization and NF resiliency
FIG. 3

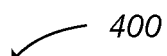

400

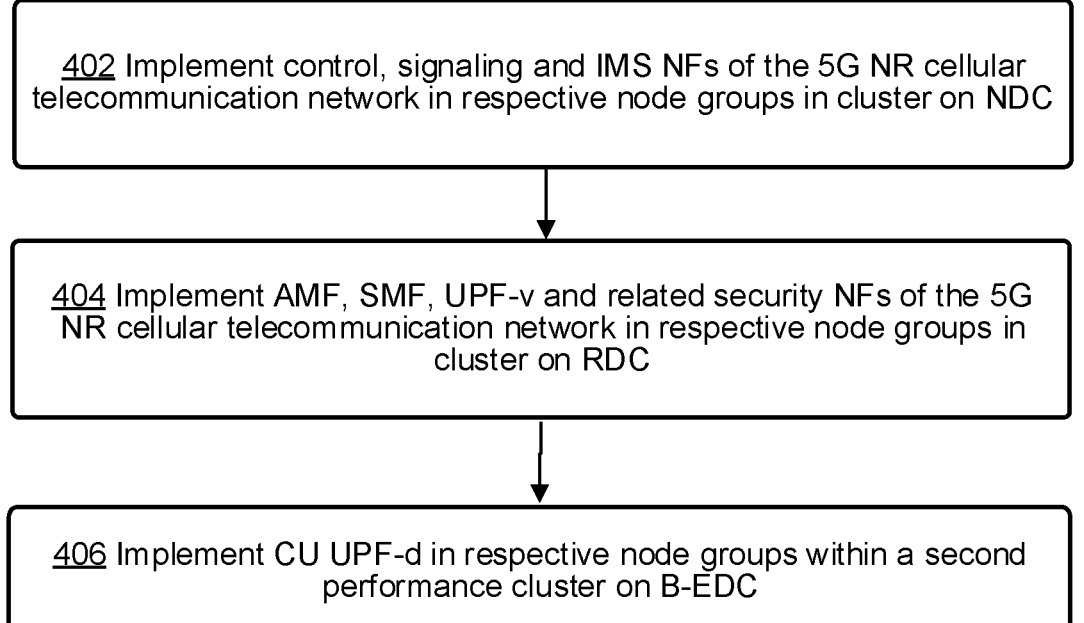

402 Implement control, signaling and IMS NFs of the 5G NR cellular telecommunication network in respective node groups in cluster on NDC 404 Implement AMF, SMF, UPF-v and related security NFs of the 5G NR cellular telecommunication network in respective node groups in cluster on RDC 406 Implement CU UPF-d in respective node groups within a second performance cluster on B-EDC

*FIG. 4*

500
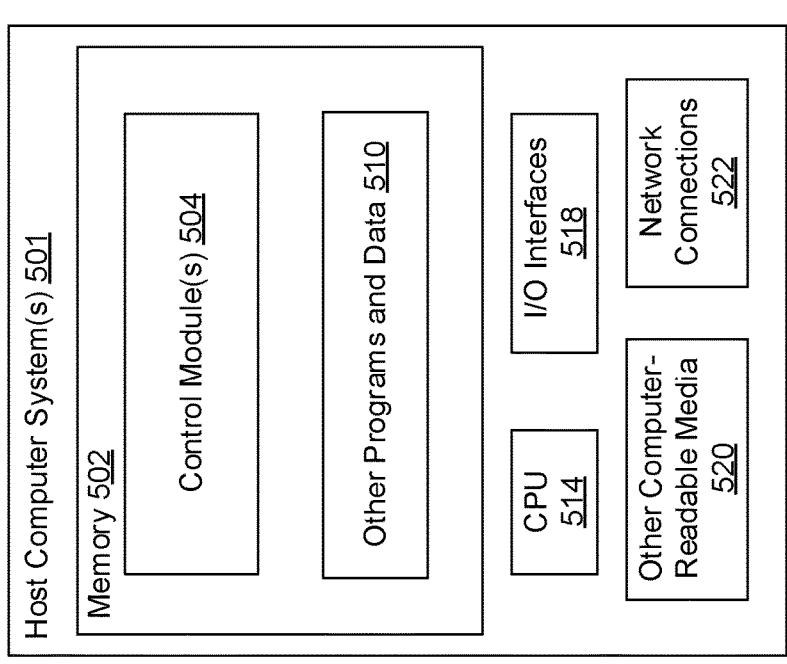
Host Computer System(s) 501
Memory 502
Control Module(s) 504
Other Programs and Data 510
CPU 514
I/O Interfaces 518
Other Computer-Readable Media 520
Network Connections 522
*FIG. 5*

UTILIZATION OF NETWORK FUNCTION (NF) NODE GROUPS FOR COMPUTE OPTIMIZATION AND NF RESILIENCY IN A WIRELESS TELECOMMUNICATION NETWORK

TECHNICAL FIELD

The present disclosure relates generally to telecommunication networks, more particularly, to utilization of NF node groups for compute optimization and NF resiliency in a wireless telecommunication network.

BRIEF SUMMARY

It is advantageous to provide Fifth Generation (5G) wireless technology in a resilient, flexible manner that optimizes compute resources. It is with respect to these and other considerations that the embodiments described herein have been made.

5G provides a broad range of wireless services delivered to the end user across multiple access platforms and multi-layer networks. 5G is a dynamic, coherent and flexible framework of multiple advanced technologies supporting a variety of applications. 5G utilizes an intelligent architec-ture, with Radio Access Networks (RANs) not constrained by base station proximity or complex infrastructure. 5G enables a disaggregated, flexible and virtualized RAN with interfaces creating additional data access points.

5G network functions may be completely software-based and designed as cloud-native, meaning that they're agnostic to the underlying cloud infrastructure, allowing higher deployment, agility and flexibility. With the advent of 5G, industry experts defined how the 5G core (5GC) network should evolve to support the needs of 5G New Radio (NR) and the advanced use cases enabled by it. The 3rd Genera-tion Partnership Project (3GPP) develops protocols and standards for telecommunication technologies including RAN, core transport networks and service capabilities. 3GPP has provided complete system specifications for 5G network architecture which is much more service oriented than previous generations.

Multi-Access Edge Computing (MEC) is an important element of 5G architecture. MEC is an evolution in cloud computing that brings the applications from centralized data centers to the network edge, and therefore closer to the end users and their devices. This essentially creates a shortcut in content delivery between the user and host, and the long network path that once separated them.

This MEC technology is not exclusive to 5G but is certainly important to its efficiency. Characteristics of the MEC include the low latency, high bandwidth and real time access to RAN information that distinguishes 5G architec-ture from its predecessors. This convergence of the RAN and core networks enables operators to leverage new approaches to network testing and validation. 5G networks based on the 3GPP 5G specifications provide an environment for MEC deployment. The 5G specifications define the enablers for edge computing, allowing MEC and 5G to collaboratively route traffic. In addition to the latency and bandwidth benefits of the MEC architecture, the distribution of com-puting power is better enables the high volume of connected devices inherent to 5G deployment and the rise of IoT.

The 3rd Generation Partnership Project (3GPP) develops protocols for mobile telecommunications and has developed a standard for 5G. The 5G architecture is based on what is called a Service-Based Architecture (SBA), which implements IT network principles and a cloud-native design approach. In this architecture, each network function (NF) offers one or more services to other NFs via Application Programming Interfaces (API). Network function virtual-ization (NFV) decouples software from hardware by replac-ing various network functions such as firewalls, load bal-ancers and routers with virtualized instances running as software. This eliminates the need to invest in many expen-sive hardware elements and can also accelerate installation times, thereby providing revenue generating services to the customer faster.

NFV enables the 5G infrastructure by virtualizing appli-ances within the 5G network. This includes the network slicing technology that enables multiple virtual networks to run simultaneously. NFV may address other 5G challenges through virtualized computing, storage, and network resources that are customized based on the applications and customer segments. The concept of NFV extends to the RAN through, for example, network disaggregation pro-moted by alliances such as O-RAN. This enables flexibility, provides open interfaces and open source development, ultimately to ease the deployment of new features and technology with scale. The O-RAN ALLIANCE objective is to allow multi-vendor deployment with off-the shelf hard-ware for the purposes of easier and faster inter-operability. Network disaggregation also allows components of the network to be virtualized, providing a means to scale and improve user experience as capacity grows. The benefits of virtualizing components of the RAN provide a means to be more cost effective from a hardware and software viewpoint especially for IoT applications where the number of devices is in the millions.

The 5G New Radio (5G NR) RAN comprises of a set of radio base stations (each known as Next Generation Node B (gNb)) connected to the 5G core (5GC) and to each other. The gNb incorporates three main functional modules: the Centralized Unit (CU), the distributed Unit (DU), and the Radio Unit (RU), which can be deployed in multiple com-binations. The primary interface is referred to as the F1 interface between DU and CU and are interoperable across vendors. The CU may be further disaggregated into the CU user plane (CU-UP) and CU control plane (CU-CP), both of which connect to the DU over F1-U and F1-C interfaces respectively. This 5G RAN architecture is described in 3GPP TS 38.401 V16.8.0 (2021-12). Each network function (NF) is formed by a combination of small pieces of software code called as microservices.

Embodiments, described herein may use containerization to implement such microservices. Containerization is the packaging of software code with just the operating system (OS) libraries and dependencies required to run the code to create a single lightweight executable (a container) that runs consistently on any infrastructure. Software platforms, such as Kubernetes, manage containerized workloads and auto-mate the deployment, scaling, and management of contain-erized applications. Compared to virtual machines (VMs) containers have relaxed isolation properties to share the Operating System (OS) among the applications. Therefore, containers are considered lightweight. A container has its own file system, share of CPU, memory and process space. As they are decoupled from the underlying infrastructure, they are portable across clouds and OS distributions.

A cluster is made up of nodes that run containerized applications. Each cluster also has a master (control plane) that manages the nodes and pods of the cluster. A node represents a single machine in a cluster, typically either a physical machine or virtual machine that's located either on-premises or hosted by a cloud service provider. Each node hosts groups of one or more containers (which run applications), and the master communicates with nodes about when to create or destroy containers and how to re-route traffic based on new container alignments. The Kubernetes master is the access point (or the control plane) from which administrators and other users interact with the cluster to manage the scheduling and deployment of containers.

A pod is the basic unit of scheduling for applications running on a cluster. The applications are running in containers, and each pod comprises one or more container(s). While pods are able to house multiple containers, one-container-per-pod may also be used. In some situations, containers that are tightly coupled and need to share resources may sit in the same pod. Pods can quickly and easily communicate with one another as if they were running on the same machine. They do still, however, maintain a degree of isolation. Each pod is assigned a unique IP address within the cluster, allowing the application to use ports without conflict.

Pods are designed as relatively ephemeral, disposable entities. When a pod gets created, it is scheduled to run on a node. The pod remains on that node until the process is terminated, the pod object is deleted, the pod is evicted for lack of resources, or the node fails. In Kubernetes, pods are the unit of replication. If an application becomes overly popular and a pod can no longer facilitate the load, Kubernetes can deploy replicas of the pod to the cluster.

Software container orchestration platforms, such as Amazon Elastic Kubernetes Service (Amazon EKS) or other EKS platforms, are services for users to run Kubernetes on the cloud of a cloud computing service provider, such as Amazon Web Services (AWS), without the user needing to install, operate, and maintain their own Kubernetes control plane or nodes. An Amazon EKS cluster comprises of two primary components: the Amazon EKS control plane and Amazon EKS nodes that are registered with the control plane. The Amazon EKS control plane comprises of control plane nodes that run the Kubernetes software and the Kubernetes application programming interface (API) server. The control plane may run in an account managed by AWS or the telecommunication service provider, and the Kubernetes API is exposed via the Amazon EKS endpoint associated with the cluster. Each Amazon EKS cluster control plane is single-tenant and unique, and runs on its own set of Amazon EC2 instances. The cluster control plane may be provisioned across multiple Availability Zones (AZs) and fronted by an Elastic Load Balancing Network Load Balancer. Amazon EKS may also provision elastic network interfaces in VPC subnets to provide connectivity from the control plane instances to the nodes. Amazon EKS nodes may run in an AWS account of the telecommunication service provider and connects to the telecommunication service provider's cluster control plane via the API server endpoint and a certificate file that is created for the cluster.

As disclosed herein, NFs of the 5G NR cellular telecommunication network implemented in respective node groups are useful mechanisms for creating pools of resources in the 5G network that can enforce scheduling requirements. They also provide a utility for shifting workloads around in the 5G network during cluster management and updates.

Briefly described, embodiments disclosed herein are directed toward utilization of NF node groups for compute optimization and NF resiliency in a wireless telecommunication network. In one example embodiment, the system implements a plurality of fifth-generation New Radio (5G NR) cellular telecommunication NFs of a telecommunication service provider as respective containerized network functions (CNFs) of a plurality of CNFs. Each CNF of the plurality of CNFs corresponds to and is implemented by one or more software containers of one or more respective pods for scheduling and execution on one or more respective nodes in a software container orchestration platform that automates deployment, management, and scaling of containerized software applications. For each CNF of the plurality of CNFs, the system deploys the one or more respective nodes of the CNF in a respective node group of the container orchestration platform. The system utilizes the respective node group for compute optimization and NF resiliency of the 5G NR cellular telecommunication network at a logical level of the one or more respective pods.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIG. 3 illustrates a logical flow diagram showing an example embodiment of a process for utilization of NF node groups for compute optimization and NF resiliency in a wireless telecommunication network in accordance with embodiments described herein.

FIG. 4 illustrates a logical flow diagram showing an example embodiment of a process useful in the process of FIG. 3 for implementing the plurality of 5G NR NFs as respective CNFs in accordance with embodiments described herein.

FIG. 5 shows a system diagram that describes an example implementation of a computing system(s) for implementing embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
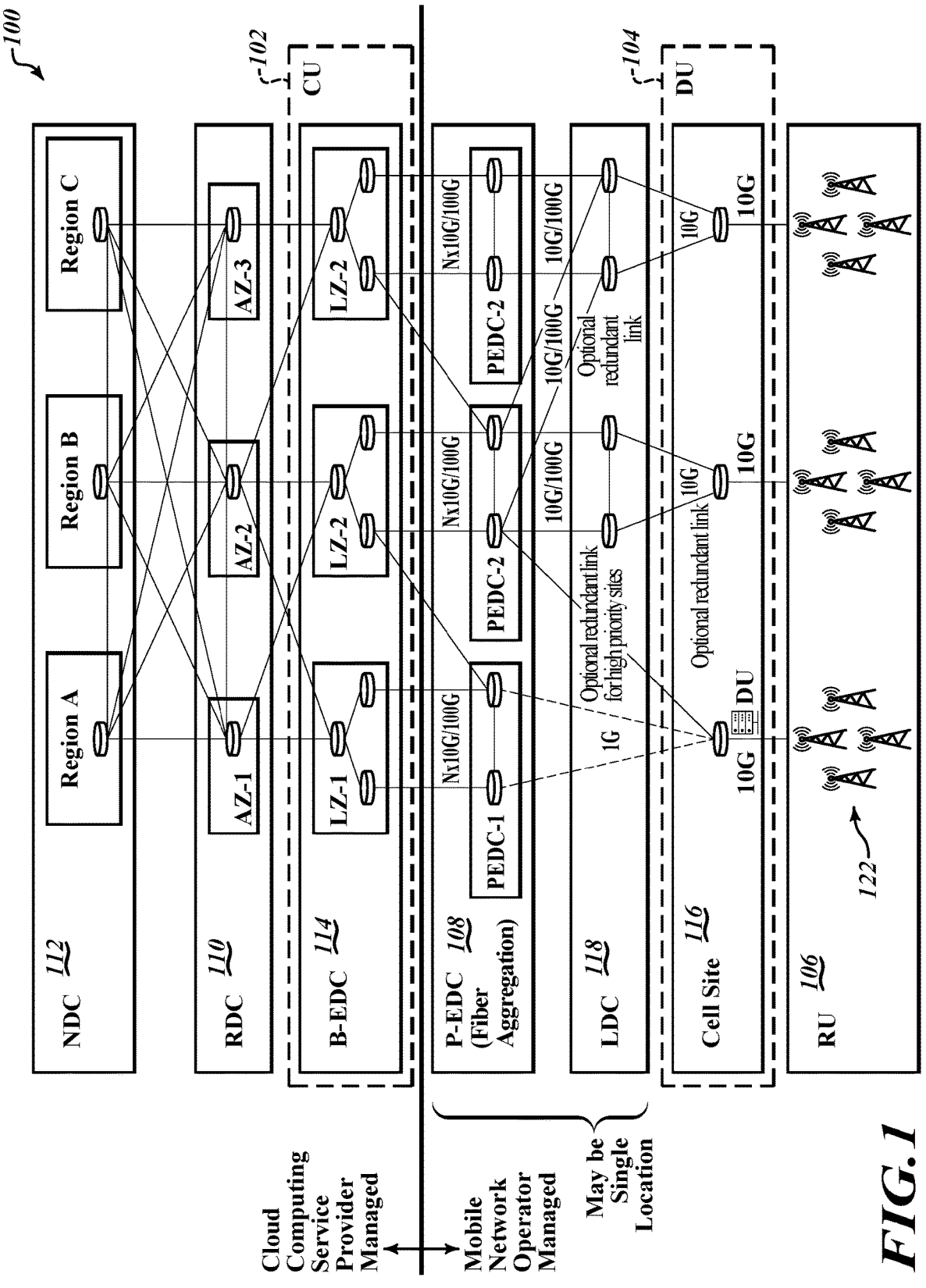
FIG. 1 illustrates a diagram of an example system architecture overview of a system in which utilization of NF node groups for compute optimization and NF resiliency in a wireless telecommunication network may be implemented in accordance with embodiments described herein.

FIG. 1 illustrates a diagram of an example system architecture overview of a system 100 in which utilization of NF node groups for compute optimization and NF resiliency in a wireless telecommunication network may be implemented in accordance with embodiments described herein.

The system 100 illustrates an example architecture of at least one wireless network of a mobile network operator (MNO) that is operated and/or controlled by the MNO. The system may comprise a 5G wireless cellular telecommunication network including a disaggregated, flexible and virtual RAN with interfaces creating additional data access points and that is not constrained by base station proximity or complex infrastructure. As shown in FIG. 1, a 5G RAN is split into DUs (e.g., DU 104) that manage scheduling of all the users and a CU 102 that manages the mobility and radio resource control (RRC) state for all the UEs. The RRC is a layer within the 5G NR protocol stack.

As shown in FIG. 1, the radio unit (RU) 106 converts radio signals sent to and from the antenna of base stations 122 into a digital signal for transmission over packet networks. It handles the digital front end (DFE) and the lower physical (PHY) layer, as well as the digital beamforming functionality.

The DU 104 may sit close to the RU 106 and runs the radio link control (RLC), the Medium Access Control (MAC) sublayer of the 5G NR protocol stack, and parts of the PHY layer. The MAC sublayer interfaces to the RLC sublayer from above and to the PHY layer from below. The MAC sublayer maps information between logical and transport channels. Logical channels are about the type of information carried whereas transport channels are about how such information is carried. This logical node includes a subset of the gNb functions, depending on the functional split option, and its operation is controlled by the CU 102.

The CU 102 is the centralized unit that runs the RRC and Packet Data Convergence Protocol (PDCP) layers. A gNb may comprise a CU and one DU connected to the CU via Fs-C and Fs-U interfaces for control plane (CP) and user plane (UP) respectively. A CU with multiple DUs will support multiple gNbs. The split architecture enables a 5G network to utilize different distribution of protocol stacks between CU 102 and DU 104 depending on midhaul availability and network design. The CU 102 is a logical node that includes the gNb functions like transfer of user data, mobility control, RAN sharing, positioning, session management etc., with the exception of functions that may be allocated exclusively to the DU 104. The CU 102 controls the operation of several DUs 104 over the midhaul interface.

As mentioned above, 5G network functionality is split into two functional units: the DU 104, responsible for real time 5G layer 1 (L1) and 5G layer 2 (L2) scheduling functions, and the CU 102 responsible for non-real time, higher L2 and 5G layer 3 (L3). As shown in FIG. 1, the DU's server and relevant software may be hosted on a cell site 116 itself or can be hosted in an edge cloud (local data center (LDC) 118 or central office) depending on transport availability and fronthaul interface. The CU's server and relevant software may be hosted in a regional cloud data center or, as shown in FIG. 1, in a breakout edge data center (B-EDC) 114. As shown in FIG. 1, the DU 104 may be provisioned to communicate via a pass through edge data center (P-EDC) 108. The P-EDC 108 may provide a direct circuit fiber connection from the DU directly to the primary physical data center (e.g., B-EDC 114) hosting the CU 102. In some embodiments, the LDC 118, P-EDC 108 and/or the B-EDC 114 may be co-located or in a single location. The CU 102 may be connected to a regional cloud data center (RDC) 110, which in turn may be connected to a national cloud data center (NDC) 112. In the example embodiment, the P-EDC 108, the LDC 118, the cell site 116 and the RU 106 may all be managed and/or controlled by the mobile network operator and the B-EDC 114, the RDC 110 and the NDC 112 may all be managed and/or hosted by a cloud computing service provider. In some embodiments, the P-EDC 108, LDC 118 and cell site 116 may be at a single location or facility (e.g., a colocation data center). In other embodiments, the B-EDC 114, the P-EDC 108, the LDC 118 and cell site 116 may be at a single location or facility (e.g., a colocation data center). According to various embodiments, the actual split between DU and RU may be different depending on the specific use-case and implementation.

Figure 2A:
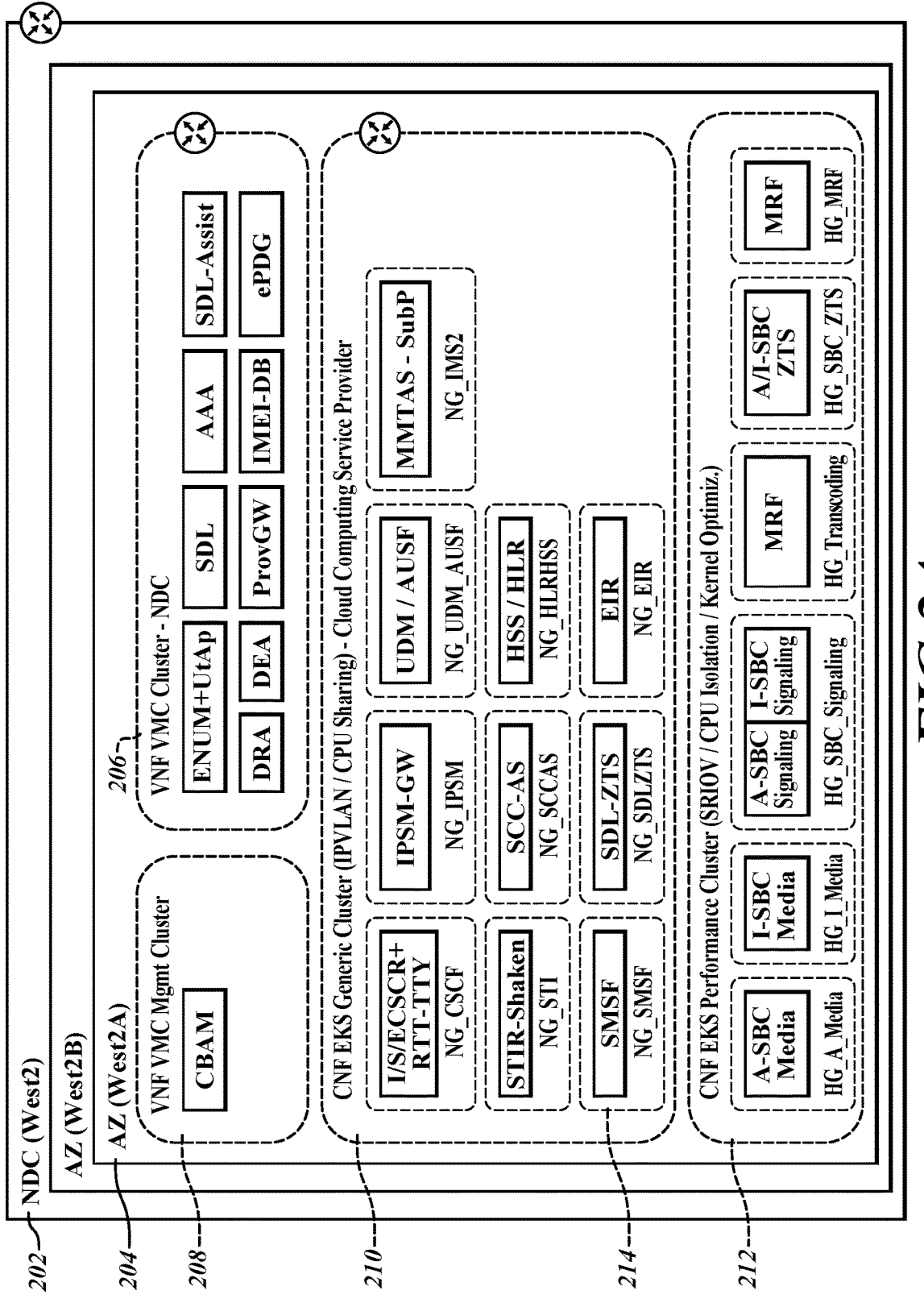
FIG. 2A is a diagram of a national data center (NDC) of a cloud computing service provider hosting NFs of a 5G NR cellular telecommunication network in respective node groups within one or more respective clusters of a software container orchestration platform in a virtual provide cloud (VPC).

FIG. 2A is a diagram of a national data center (NDC) 202 of a cloud computing service provider hosting NFs of a 5G NR cellular telecommunication network in respective node groups within one or more respective clusters of a software container orchestration platform in a virtual provide cloud (VPC).

Shown are respective software container orchestration platform clusters hosted within an availability zone (AZ) 204 by the NDC 202 of a cloud computing service provider. The AZ 204 may be one or more discrete data centers with redundant power, networking, and connectivity in a region of the cloud computing service provider. AZs provides the telecommunication service provider the ability to operate the 5G NR cellular telecommunication network in a manner that is more highly available, fault tolerant, and scalable than would be possible from a single data center. In an example embodiment, all AZs in a region of the cloud computing service provider (e.g., region West2A) are interconnected with high-bandwidth, low-latency networking, over fully redundant, dedicated metro fiber providing high-throughput, low-latency networking between AZs.

Shown operating within the AZ 204 is cluster 208, cluster 206, cluster 210 and cluster 212, which implement CNFs including control NFs, Internet Protocol Multimedia Subsystem (IMS) NFs and signaling NFs of the 5G NR cellular telecommunication network in respective node groups within their respective clusters of the software container orchestration platform in a virtual provide cloud (VPC). For example node group 214 within cluster 210 implements the Short Message Service Function (SMSF) of the 5G NR cellular telecommunication network. In an example embodiment, the software container orchestration platform is Amazon Elastic Kubernetes Service (Amazon EKS). However, other software container orchestration platforms may be used in various other embodiments.

Each CNF of the CNFs implemented by cluster 208, cluster 206, cluster 210 and cluster 212 corresponds to and is implemented by one or more software containers of one or more respective pods for scheduling and execution on one or more respective nodes in a software container orchestration platform that automates deployment, management, and scaling of containerized software applications (such as Amazon EKS). For each of the CNFs, the telecommunication service provider deploys one or more respective nodes of the CNF in a respective node group of the container orchestration platform. Via the container orchestration platform, the telecommunication service provider utilizes the respective node group for compute optimization and NF resiliency of the 5G NR cellular telecommunication network at a logical level of the one or more respective pods.

Figure 2B:
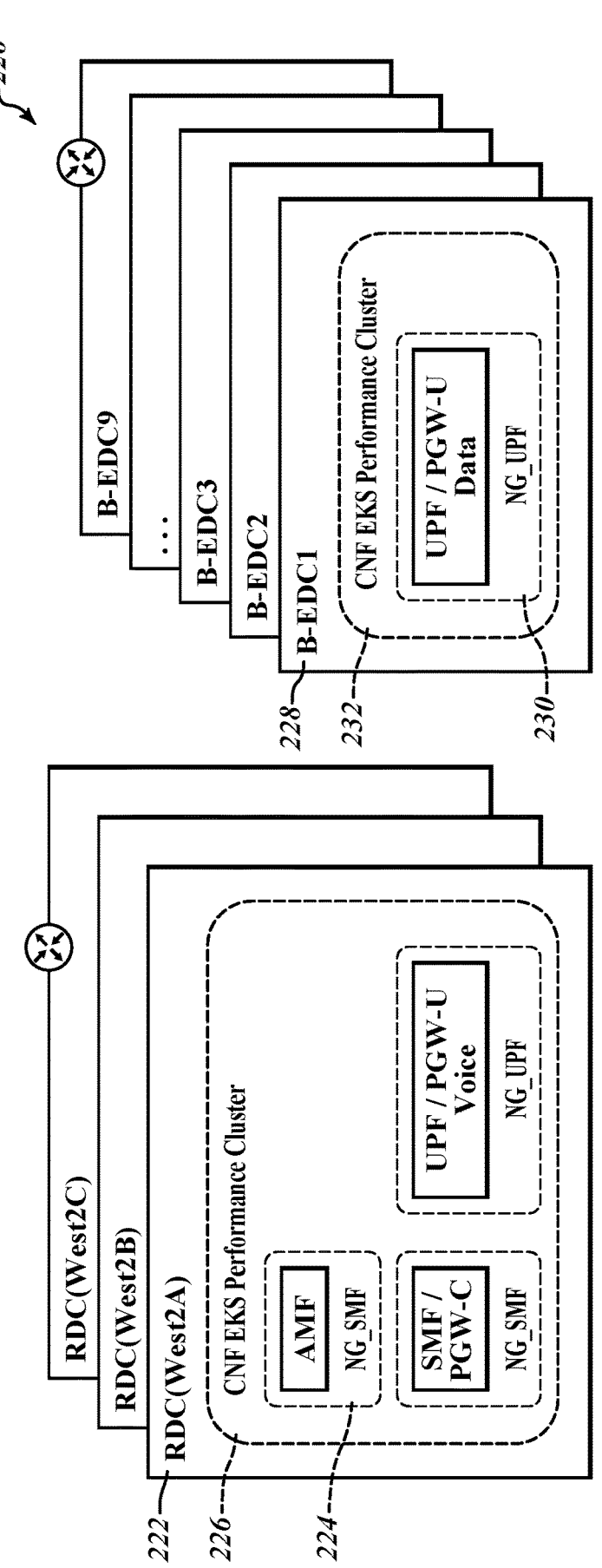
FIG. 2B is a diagram of a system including regional data center (RDC) of a cloud computing service provider connected to a breakout edge data center (B-EDC) of the cloud computing service provider, each hosting NFs of a 5G NR cellular telecommunication network in respective node groups within one or more respective clusters of a software container orchestration platform in a virtual provide cloud (VPC).

FIG. 2B is a diagram of a system 220 including an example regional data center (RDC) 222 of a cloud computing service provider connected to an example breakout edge data center (B-EDC) 228 of the cloud computing service provider, each hosting NFs of a 5G NR cellular telecommunication network in respective node groups within one or more respective clusters of a software container orchestration platform in a virtual provide cloud (VPC).

In the example embodiment shown, the system 220 implements access and mobility management Function (AMF), session management function (SMF), user plane function for voice (UPF-v) and related security NFs of the 5G NR cellular telecommunication network in respective node groups (e.g., node group 224 is shown for the AMF) within a first performance cluster 226 of the software container orchestration platform in a virtual provide cloud (VPC). The first performance cluster hosted by regional data center (RDC) 222 of the cloud computing service provider associated with the NDC 202 of FIG. 2A.

The system 220 implements a CU and a user plane function for data (UPF-d) of the 5G NR cellular telecommunication network in respective node groups (e.g., node group 230 is shown for UPF-d) within a second performance cluster 232 of the software container orchestration platform in a VPC. The second performance cluster 232 is hosted by a breakout edge data center (B-EDC) 238 of the cloud computing service provider. A P-EDC of the telecommunication service provider (e.g., P-EDC 108 of FIG. 1) may be physically located at a colocation data center (colo) with a physical server implementing the B-EDC 238 and may be directly connected via cable in the colo to a physical server implementing the B-EDC 238.

FIG. 3 illustrates a logical flow diagram showing an example embodiment of a process 300 for utilization of NF node groups for compute optimization and NF resiliency in a wireless telecommunication network in accordance with embodiments described herein.

At 302 the system 100, implements a plurality of fifth-generation New Radio (5G NR) cellular telecommunication network functions (NFs) of a telecommunication service provider as respective containerized network functions (CNFs) of a plurality of CNFs. Each CNF of the plurality of CNFs corresponds to and is implemented by one or more software containers of one or more respective pods for scheduling and execution on one or more respective nodes in a software container orchestration platform that automates deployment, management, and scaling of containerized software applications.

At 304, the system 100, for each CNF of the plurality of CNFs, deploys the one or more respective nodes of the CNF in a respective node group of the container orchestration platform.

At 306, the system 100, for each CNF of the plurality of CNFs, utilizes the respective node group for compute optimization and NF resiliency of the 5G NR cellular telecommunication network at a logical level of the one or more respective pods. For example, the utilization of the respective node group for compute optimization and NF resiliency may include auto-scaling, for compute optimization, a size of the respective node group by adjusting pods of the node group responsive to compute demand of the respective NF of the 5G NR cellular telecommunication network. In some embodiments, the utilization of the respective node group for compute optimization and NF resiliency includes microservices of the one or more software containers of the one or more respective pods performing closed loop assurance. The closed loop assurance may include collecting, storing, and processing network data and performing remediation actions to recover from detected failures in the respective NF of the 5G NR cellular telecommunication network.

FIG. 4 illustrates a logical flow diagram showing an example embodiment of a process 400 useful in the process of FIG. 3 for implementing the plurality of 5G NR NFs as respective CNFs in accordance with embodiments described herein. 567

At 402, the system 100, implements control, signaling and Internet Protocol Multimedia Subsystem (IMS) NFs of the 5G NR cellular telecommunication network in respective node groups within one or more respective clusters of the software container orchestration platform in a virtual VPC. The respective clusters may be hosted within an availability zone (AZ) by a national data center (NDC) of a cloud computing service provider.

At 404, the system 100, implementing access and mobility management Function (AMF), session management function (SMF), user plane function for voice (UPF-v) and related security NFs of the 5G NR cellular telecommunication network in respective node groups within a first performance cluster of the software container orchestration platform in a VPC. The first performance cluster may be hosted by a regional data center (RDC) of the cloud computing service provider associated with the NDC.

At 406, the system 100, implementing a centralized unit (CU) and a user plane function for data (UPF-d) of the 5G NR cellular telecommunication network in respective node groups within a second performance cluster of the software container orchestration platform in a VPC. The second performance cluster is hosted by a breakout edge data center (B-EDC) of the cloud computing service provider. A pass-through edge data center (P-EDC) of the telecommunication service provider may be physically located at a colocation data center (colo) with a physical server implementing the B-EDC and may be directly connected via cable in the colo to a physical server implementing the B-EDC.

FIG. 5 shows a system diagram that describes an example implementation of a computing systems (or systems) 500 for implementing embodiments described herein.

The functionality described herein utilizing NF node groups for compute optimization and NF resiliency in a wireless telecommunication network can be implemented either on dedicated hardware, as a software instance running on dedicated hardware, or as a virtualized function instantiated on an appropriate platform, e.g., a cloud infrastructure. In some embodiments, such functionality may be completely software-based and designed as cloud-native, meaning that they're agnostic to the underlying cloud infrastructure, allowing higher deployment agility and flexibility. However, FIG. 5 illustrates an example of underlying hardware on which such software and functionality may be hosted and/or implemented.

In particular, shown is example host computer system(s) 501. For example, such computer system(s) 501 may represent one or more of those in various data centers, base stations and cell sites shown and/or described herein that are, or that host or implement the functions of: routers, components, microservices, nodes, node groups, control planes, clusters, virtual machines, NFs, and other aspects described herein to utilize NF node groups for compute optimization and NF resiliency in a wireless telecommunication network. In some embodiments, one or more special-purpose computing systems may be used to implement the functionality described herein. Accordingly, various embodiments described herein may be implemented in software, hardware, firmware, or in some combination thereof. Host computer system(s) 501 may include memory 502, one or more central processing units (CPUs) 514, I/O interfaces 518, other computer-readable media 520, and network connections 522.

Memory 502 may include one or more various types of non-volatile and/or volatile storage technologies. Examples of memory 502 may include, but are not limited to, flash memory, hard disk drives, optical drives, solid-state drives, various types of random access memory (RAM), various types of read-only memory (ROM), neural networks, other computer-readable storage media (also referred to as processor-readable storage media), or the like, or any combination thereof. Memory 502 may be utilized to store information, including computer-readable instructions that are utilized by CPU 514 to perform actions, including those of embodiments described herein.

Memory 502 may have stored thereon control module(s) 1804. The control module(s) 1804 may be configured to implement and/or perform some or all of the functions of the systems, components and modules described herein to utilize NF node groups for compute optimization and NF resiliency in a wireless telecommunication network. Memory 502 may also store other programs and data 510, which may include rules, databases, application programming interfaces (APIs), software containers, nodes, pods, clusters, node groups, control planes, software defined data centers (SDDCs), microservices, virtualized environments, software platforms, cloud computing service software, network management software, network orchestrator software, network functions (NF), artificial intelligence (AI) or machine learning (ML) programs or models to perform the functionality described herein, user interfaces, operating systems, other network management functions, other NFs, etc.

Network connections 522 are configured to communicate with other computing devices to facilitate the functionality described herein. In various embodiments, the network connections 522 include transmitters and receivers (not illustrated), cellular telecommunication network equipment and interfaces, and/or other computer network equipment and interfaces to send and receive data as described herein, such as to send and receive instructions, commands and data to implement the processes described herein. I/O interfaces 518 may include a video interfaces, other data input or output interfaces, or the like. Other computer-readable media 520 may include other types of stationary or removable computer-readable media, such as removable flash drives, external hard drives, or the like.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for implementing telecommunication network functions comprising:

implementing a plurality of fifth-generation New Radio (5G NR) cellular telecommunication network functions (NFs) of a telecommunication service provider as respective containerized network functions (CNFs) of a plurality of CNFs, wherein each CNF of the plurality of CNFs corresponds to and is implemented by one or more software containers of one or more respective pods for scheduling and execution on one or more respective nodes in a software container orchestration platform that automates deployment, management, and scaling of containerized software applications, wherein each of the one or more respective nodes represents a single physical machine or single virtual machine in a cluster and hosts groups of one or more containers, which run applications, and wherein a master communicates with the one or more respective nodes about when to create or destroy containers and how to re-route traffic based on new container alignments;

for each CNF of the plurality of CNFs:

deploying the one or more respective nodes of the CNF in a respective node group within a respective cluster of the container orchestration platform; and utilizing the respective node group for compute optimization and NF resiliency of the 5G NR cellular telecommunication network at a logical level of the one or more respective pods.

2. The method of claim 1 wherein the utilizing the respective node group for compute optimization and NF resiliency includes:

auto-scaling, for compute optimization, a size of the respective node group by adjusting pods of the node group responsive to compute demand of the respective NF of the 5G NR cellular telecommunication network.

3. The method of claim 1 wherein the utilizing the respective node group for compute optimization and NF resiliency includes:

microservices of the one or more software containers of the one or more respective pods performing closed loop assurance, including collecting, storing, and processing network data and performing remediation actions to recover from detected failures in the respective NF of the 5G NR cellular telecommunication network.

4. The method of claim 1, wherein the implementing the plurality of 5G NR cellular telecommunication network functions (NFs) as respective CNFs includes:

implementing control, signaling and Internet Protocol Multimedia Subsystem (IMS) NFs of the 5G NR cellular telecommunication network in respective node groups within one or more respective clusters of the software container orchestration platform in a virtual provide cloud (VPC), the one or more respective clusters hosted within an availability zone (AZ) by a national data center (NDC) of a cloud computing service provider;

implementing access and mobility management Function (AMF), session management function (SMF), user plane function for voice (UPF-v) and related security NFs of the 5G NR cellular telecommunication network in respective node groups within a first performance cluster of the software container orchestration platform in a VPC, the first performance cluster hosted by a regional data center (RDC) of the cloud computing service provider associated with the NDC; and implementing a centralized unit (CU) and a user plane function for data (UPF-d) of the 5G NR cellular telecommunication network in respective node groups within a second performance cluster of the software container orchestration platform in a VPC, the second performance cluster hosted by a breakout edge data center (B-EDC) of the cloud computing service provider, wherein a pass-through edge data center (P-EDC) of the telecommunication service provider is physically located at a colocation data center (colo) with a physical server implementing the B-EDC and is directly connected via cable in the colo to a physical server implementing the B-EDC.

5. The method of claim 1 wherein the software container orchestration platform is Elastic Kubernetes Service (EKS).

6. A system for implementing telecommunication network functions comprising:

at least one memory that stores computer executable instructions; and at least one processor that executes the computer executable instructions to cause actions to be performed, the actions including:

implementing a plurality of fifth-generation New Radio (5G NR) cellular telecommunication network functions (NFs) of a telecommunication service provider as respective containerized network functions (CNFs) of a plurality of CNFs, wherein each CNF of the plurality of CNFs corresponds to and is implemented by one or more software containers of one or more respective pods for scheduling and execution on one or more respective nodes in a software container orchestration platform that automates deployment, management, and scaling of containerized software applications;

for each CNF of the plurality of CNFs:

deploying the one or more respective nodes of the CNF in a respective node group within a respective cluster of the container orchestration platform; and utilizing the respective node group for compute optimization and NF resiliency of the 5G NR cellular telecommunication network at a logical level of the one or more respective pods.

7. The system of claim 6 wherein the utilizing the respective node group for compute optimization and NF resiliency includes:

auto-scaling, for compute optimization, a size of the respective node group by adjusting pods of the node group responsive to compute demand of the respective NF of the 5G NR cellular telecommunication network.

8. The system of claim 6 wherein the utilizing the respective node group for compute optimization and NF resiliency includes:

microservices of the one or more software containers of the one or more respective pods performing closed loop assurance, including collecting, storing, and processing network data and performing remediation actions to recover from detected failures in the respective NF of the 5G NR cellular telecommunication network.

9. The system of claim 6, wherein the implementing the plurality of 5G NR cellular telecommunication network functions (NFs) as respective CNFs includes:

implementing control, signaling and Internet Protocol Multimedia Subsystem (IMS) NFs of the 5G NR cellular telecommunication network in respective node groups within one or more respective clusters of the software container orchestration platform in a virtual provide cloud (VPC), the one or more respective clusters hosted within an availability zone (AZ) by a national data center (NDC) of a cloud computing service provider;

implementing access and mobility management Function (AMF), session management function (SMF), user plane function for voice (UPF-v) and related security NFs of the 5G NR cellular telecommunication network in respective node groups within a first performance cluster of the software container orchestration platform in a VPC, the first performance cluster hosted by a regional data center (RDC) of the cloud computing service provider associated with the NDC; and implementing a centralized unit (CU) and a user plane function for data (UPF-d) of the 5G NR cellular telecommunication network in respective node groups within a second performance cluster of the software container orchestration platform in a VPC, the second performance cluster hosted by a breakout edge data center (B-EDC) of the cloud computing service provider, wherein a pass-through edge data center (P-EDC) of the telecommunication service provider is physically located at a colocation data center (colo) with a physical server implementing the B-EDC and is directly connected via cable in the colo to a physical server implementing the B-EDC.

10. The system of claim 6 wherein the software container orchestration platform is Elastic Kubernetes Service (EKS).

11. A non-transitory computer-readable storage medium having computer-executable instructions stored thereon that, when executed by at least one processor, cause the at least one processor to cause actions to be performed, the actions including:

implementing a plurality of fifth-generation New Radio (5G NR) cellular telecommunication network functions (NFs) of a telecommunication service provider as respective containerized network functions (CNFs) of a plurality of CNFs, wherein each CNF of the plurality of CNFs corresponds to and is implemented by one or more software containers of one or more respective pods for scheduling and execution on one or more respective nodes in a software container orchestration platform that automates deployment, management, and scaling of containerized software applications;

for each CNF of the plurality of CNFs:

deploying the one or more respective nodes of the CNF in a respective node group within a respective cluster of the container orchestration platform; and utilizing the respective node group for compute optimization and NF resiliency of the 5G NR cellular telecommunication network at a logical level of the one or more respective pods.

12. The non-transitory computer-readable storage medium of claim 11 wherein the utilizing the respective node group for compute optimization and NF resiliency includes:

auto-scaling, for compute optimization, a size of the respective node group by adjusting pods of the node group responsive to compute demand of the respective NF of the 5G NR cellular telecommunication network.

13. The non-transitory computer-readable storage medium of claim 11 wherein the utilizing the respective node group for compute optimization and NF resiliency includes:

microservices of the one or more software containers of the one or more respective pods performing closed loop assurance, including collecting, storing, and processing network data and performing remediation actions to recover from detected failures in the respective NF of the 5G NR cellular telecommunication network.

14. The non-transitory computer-readable storage medium of claim 11, wherein the implementing the plurality of 5G NR cellular telecommunication network functions (NFs) as respective CNFs includes:

implementing control, signaling and Internet Protocol Multimedia Subsystem (IMS) NFs of the 5G NR cellular telecommunication network in respective node groups within one or more respective clusters of the software container orchestration platform in a virtual provide cloud (VPC), the one or more respective clusters hosted within an availability zone (AZ) by a national data center (NDC) of a cloud computing service provider;

implementing access and mobility management Function (AMF), session management function (SMF), user plane function for voice (UPF-v) and related security NFs of the 5G NR cellular telecommunication network in respective node groups within a first performance cluster of the software container orchestration platform in a VPC, the first performance cluster hosted by a regional data center (RDC) of the cloud computing service provider associated with the NDC; and implementing a centralized unit (CU) and a user plane function for data (UPF-d) of the 5G NR cellular telecommunication network in respective node groups within a second performance cluster of the software container orchestration platform in a VPC, the second performance cluster hosted by a breakout edge data center (B-EDC) of the cloud computing service provider, wherein a pass-through edge data center (P-EDC) of the telecommunication service provider is physically located at a colocation data center (colo) with a physical server implementing the B-EDC and is directly connected via cable in the colo to a physical server implementing the B-EDC.

15. The non-transitory computer-readable storage medium of claim 11 wherein the software container orchestration platform is Elastic Kubernetes Service (EKS).

* * * * *